Figure 1:
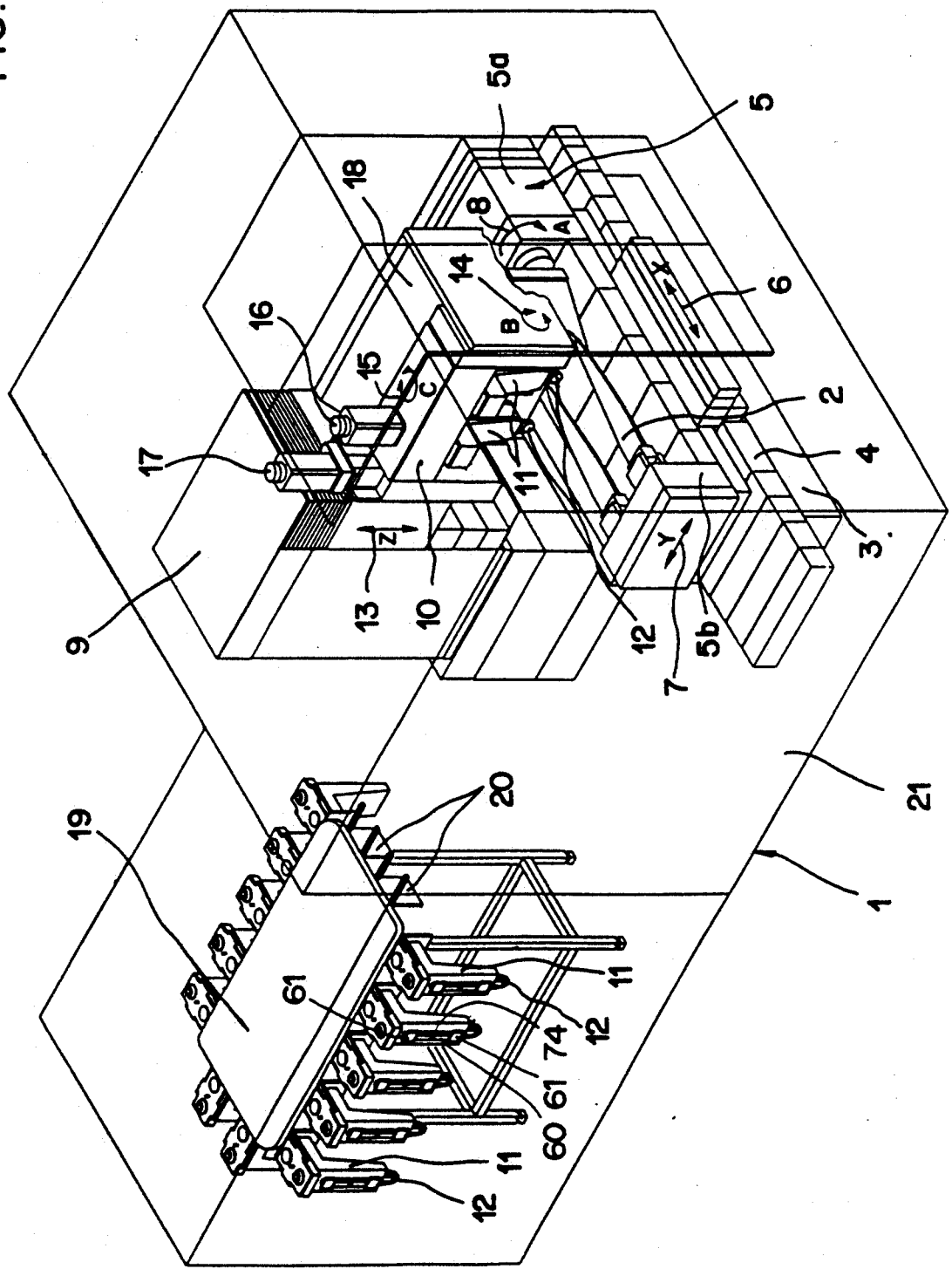

United States Patent [19]
Liechti et al.

[11] Patent Number: 5,245,792
[45] Date of Patent: Sep. 21, 1993

[54] MACHINING CENTER FOR GRINDING WORKPIECES WITH COMPLEX SHAPED SURFACES

[75] Inventors: Kurt Liechti, Langnau im Emmental; Ralph Liechti, Muri; Fritz Lehmann, Langnau im Emmental, all of Switzerland

[73] Assignee: Maschinenfabrik Liechti & Co. AG, Langnau im Emmental, Switzerland

[21] Appl. No.: 779,936

[22] Filed: Oct. 21, 1991

[30] Foreign Application Priority Data

Oct. 25, 1990 [CH] Switzerland ............... 3416/90

[51] Int. Cl.$^5$ .............................................. B24B 41/00
[52] U.S. Cl. ............................... 51/165 R; 51/165.71; 51/165.74; 51/147
[58] Field of Search ............ 51/165 R, 165.71, 165.74, 51/165.76, 281 R, 326, 328, 135 R, 147; 408/31, 34, 35, 40

[56] References Cited

U.S. PATENT DOCUMENTS

| | | | |
|---|---|---|---|
| 4,075,791 | 2/1978 | Koide et al. | 51/142 |
| 4,145,846 | 3/1979 | Howland et al. | 51/140 |
| 4,727,683 | 3/1988 | Lamb | 51/147 |
| 4,815,239 | 3/1989 | Sommer | 51/165.76 |
| 4,907,371 | 3/1990 | Shoda et al. | 51/165.76 |
| 4,958,463 | 9/1990 | Hess et al. | 51/72 R |
| 5,119,600 | 6/1992 | Chikatsune et al. | 51/165.74 |

FOREIGN PATENT DOCUMENTS

| | | |
|---|---|---|
| 0165143 | 12/1985 | European Pat. Off. . |
| 0318966 | 6/1989 | European Pat. Off. . |
| 1083717 | 5/1954 | France . |
| 2629747 | 4/1988 | France . |

*Primary Examiner*—M. Rachuba
*Attorney, Agent, or Firm*—Goodman & Teitelbaum

[57] ABSTRACT

The machining center serves for grinding workpieces with complex shaped surfaces, such as turbines or jet engine blades. One or several workpieces are clamped in a workpiece chucking device. The latter is displaceable along an X and a Y axis. Additionally, each workpiece is clamped rotatably around its longitudinal axis. A support device is disposed on a stand, and is displaceable along a vertical Z axial direction. One or several automatically exchangeable grinding attachments are inserted in support device. Each grinding attachment comprises grinding means driveable from support device. The support device is inclinable around an axis of inclination, which runs parallel to the Y axis. Each grinding attachment is rotatable by any angle around a grinding attachment longitudinal axis, which runs parallel to the Z axis when the support device is in the uninclined state. All said axes are numerically controlled. The machining center is used to achieve surface improvements in the workpieces with simultaneous correction of production errors. Thanks to the exchangeable grinding attachments placed ready in a tool store, automatic grinding with only very short stoppage times is possible.

15 Claims, 6 Drawing Sheets

MACHINING CENTER FOR GRINDING WORKPIECES WITH COMPLEX SHAPED SURFACES

This invention relates to a machining centre for grinding workpieces with complex shaped surfaces, in particular turbines or jet engine blades, with a machine bed, a workpiece chucking device, a control system and a grinding attachment with driveable grinding means disposed therein, the grinding attachment being disposed such that it is displaceable along a vertical Z-axial direction and inclinable with respect to the latter, and is tiltable around a longitudinal axis of the grinding attachment; and to a grinding attachment for the machining centre in which the grinding means has a generated surface, facing the workpiece, on a rotating cylinder-shaped disk.

Blades for steam turbines, compressors and jet engines and also airplane propellers have complex shaped surface structures. Such parts are usually manufactured by milling in complex machining centres with several numerically controlled axes. The advance and adjustment motions of both the workpiece and the milling tool are controlled by complex software via said numerically controlled axes. After production of such said parts, milling traces and milling grooves are visible on the surface. Nowadays, these must usually be additionally removed by costly manual grinding. It is obvious that such manual work on precision parts must be carried out by qualified personnel. This work is both time-consuming and costly and there is also the danger that errors become ground into the surface. Such errors may be, for example, unintentional indentations which in later use of the assembled unit, whether in a turbine or a jet engine, can lead to a reduction in the degree of efficiency.

Currently, there is only one prior art turbine blade grinding machine on the market. Mounted on a stand, it has a grinding attachment in which is housed an endless grinding belt. For machining a workpiece, the grinding belt is looped around a contact disk facing the workpiece. The machine is also equipped with six mechanical axes of movement, of which one is for the workpiece longitudinal feed (X-axis), one for the grinding attachment transverse motion (Y-axis), one for the workpiece rotary movement (A-axis), one for the inclination of the grinding attachment (B-axis) and one for changing a pivot angle of the grinding attachment (C-axis). The movement of the grinding attachment vertical to the workpiece longitudinal axis (Z-axis) is not controlled to the required measurement. The grinding arrangement is suspended oscillatingly. The contact pressure of the grinding belt on the workpiece is pneumatic, the grinding belt following the given contour on the workpiece. This is so-called tracking grinding.

Although this turbine blade grinding machine brings advantages of time compared with manual machining, it does have some disadvantages. Since, as already mentioned, this grinding is of the tracking type, where the grinding belt follows the contour of the workpiece predetermined by the production process, it is not possible to correct defects of shape or geometrical divergences from the nominal shape. The sole use of this machine is to provide an improvement in the surface.

When passing from rough grinding to precision grinding or to polish grinding long periods of stoppage are required in the prior art machine because the endless belt in the grinding attachment has to be changed.

Work with the turbine blade grinding machine requires the permanent presence of an operator.

It is the task of this invention to overcome the defects which have been pointed out. In particular, the task is to provide a machine which, when grinding the above mentioned parts with complex shaped surfaces, is capable of correcting errors in shape or geometrical divergences from the nominal shape which may have arisen during the production process; and which also optimizes the grinding process in that the stoppage times are extremely short and the permanent presence of an operator is not required.

This task is solved with a machining centre for grinding workpieces with complex shaped surfaces, wherein the workpiece chucking device is disposed on a cross slide which is movable in both a horizontal X and Y axial direction, and has two supports spaced at a distance from each other and displaceable in the X axial direction relative to each other for pivotably clamping at least one workpiece, wherein there is a device which is numerically controllable to the required measurement and displaceable in the Z axial direction for supporting at least one of the grinding attachments, wherein the support device has means for controllably holding and releasing at least one exchangeable grinding attachment, and comprises drive elements with first means for driving the grinding means disposed in the grinding attachment, wherein there is a tool store to which the support device can be pivoted and in which several of the grinding attachments are housed, and wherein there are means for transferring and automatically inserting at least one of the grinding attachments from the tool store to the support device, or vice versa. A grinding attachment for the machining centre is characterized in that there are retainer means intended to engage with the fixing means disposed on the support device and coupling means intended to couple the grinding means with the first drive means of the support device.

Advantageous embodiments of both the machining centre and the grinding attachment are set forth below.

Figure 2:
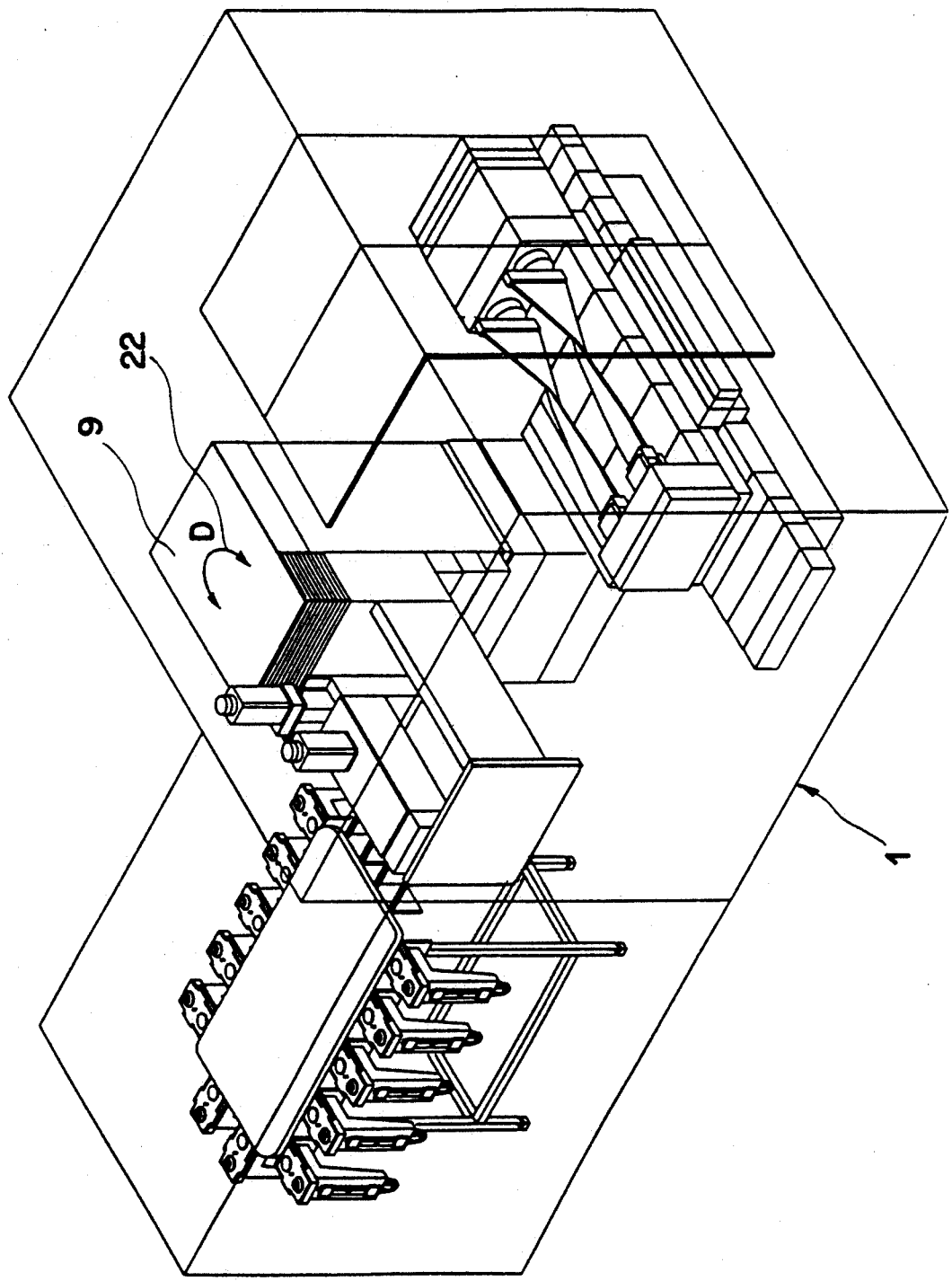
Figure 3:
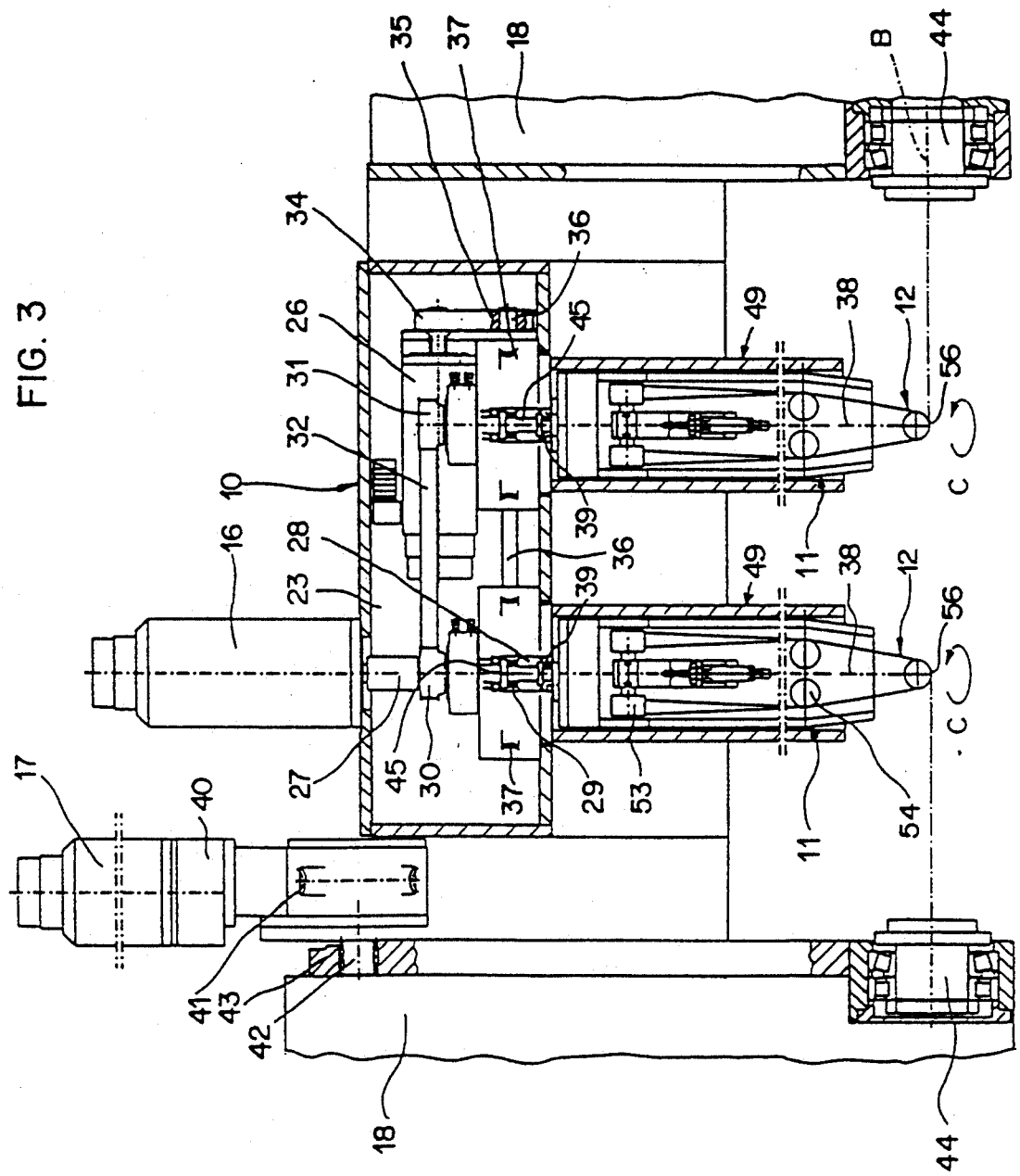
Figure 4:
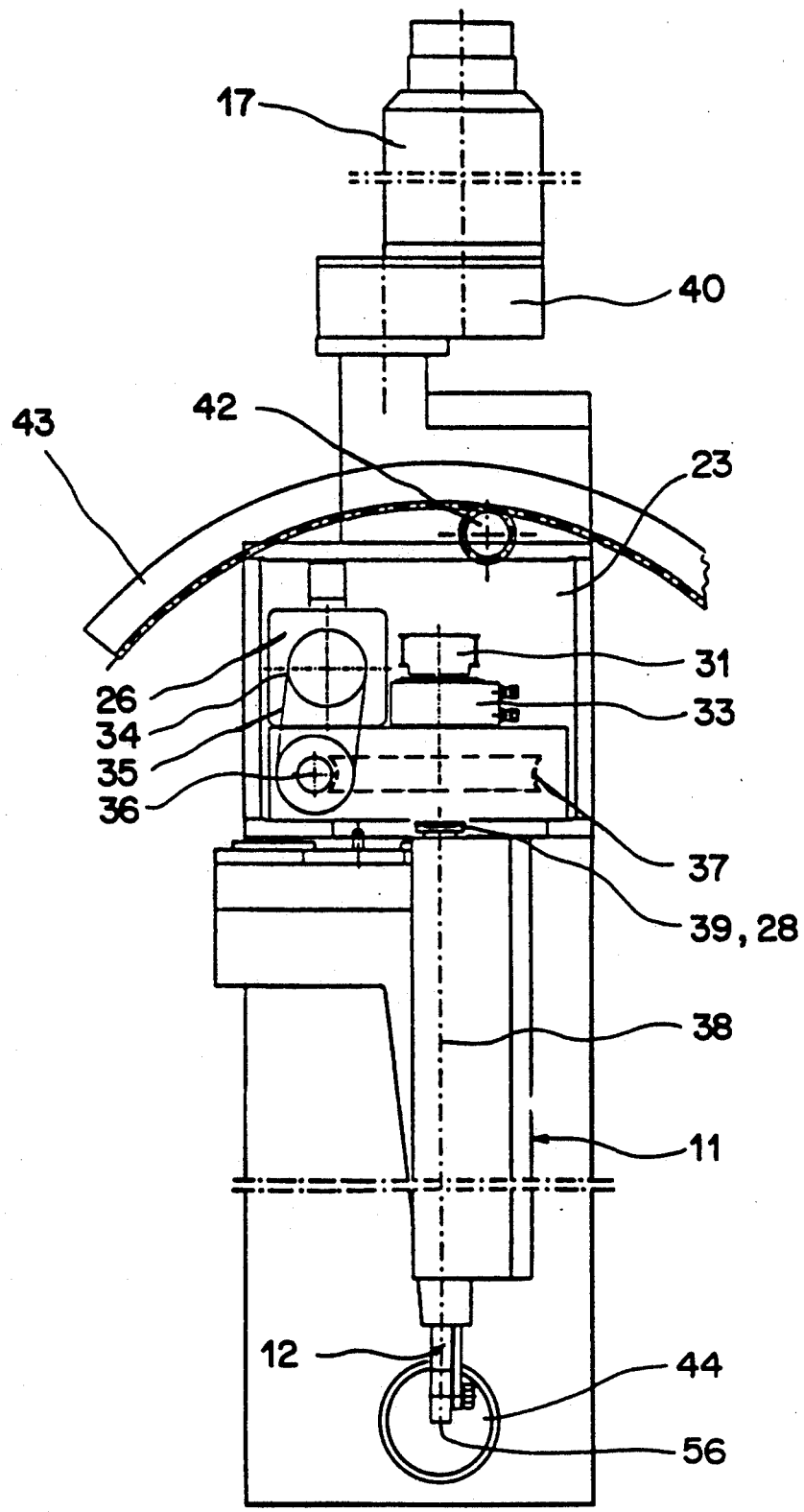
Figure 5:
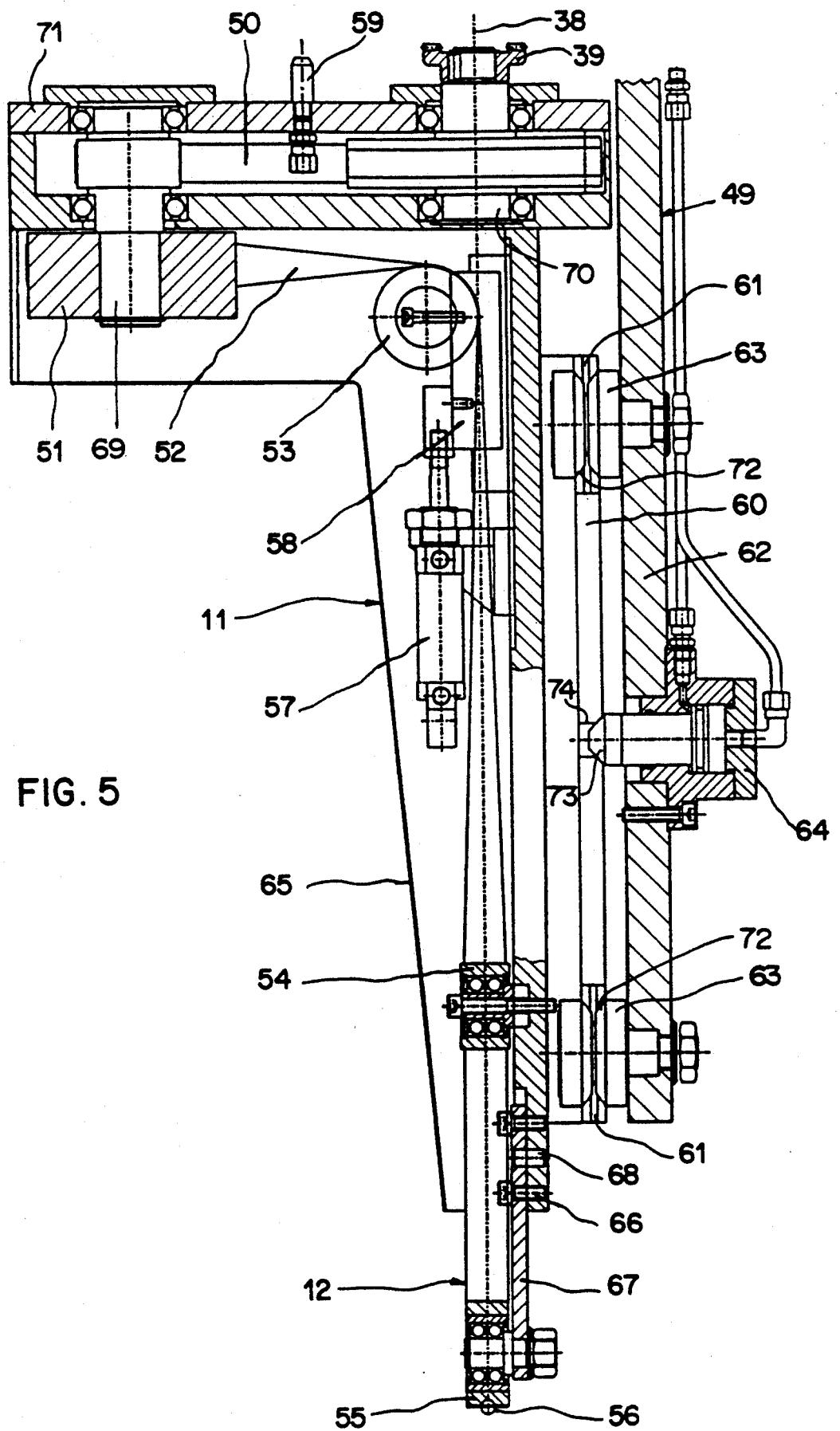
Figure 6:
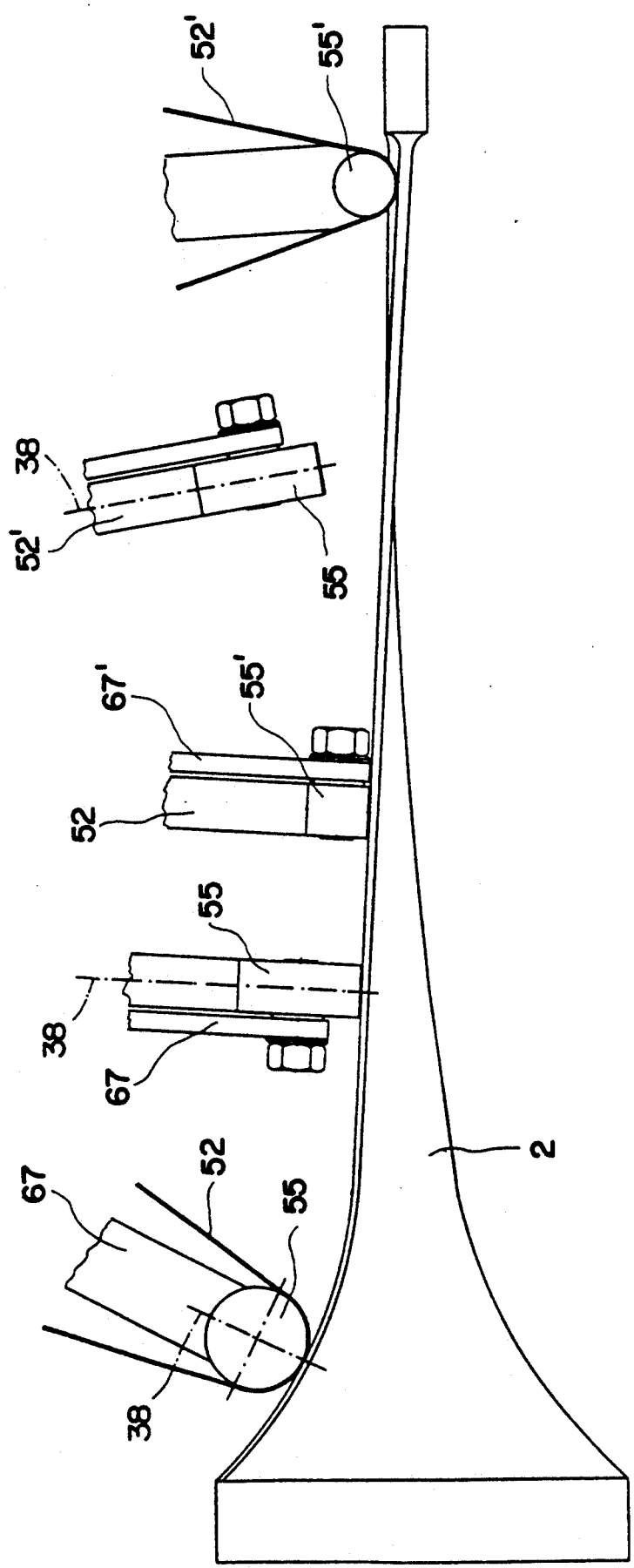

The invention will be described in more detail by way of example, with reference to the figures, in which:

FIG. 1 is an isometric illustration of a machining centre of the invention, in a zero setting, FIG. 2 is the machining centre of FIG. 1 in a position for exchanging the grinding attachments, FIG. 3 is a side elevation of a support device of the machining centre, FIG. 4 is a front elevation of the support device shown in FIG. 3, FIG. 5 is a side elevation of a grinding attachment used in the support device, and FIG. 6 shows various grinding attachment positions for machining a workpiece, although of the grinding attachment only its lower end facing the workpiece is illustrated.

With reference to FIGS. 1 and 2 the construction and mode of function of one preferred embodiment of a machining centre 1 of the invention for grinding workpieces 2 with complex shaped surfaces will first be described. Such workpieces 2, for example blades for turbines or jet engines and propellers are shown in the illustrated machining centre 1 in a workpiece chucking device 5 in the clamped state. The workpiece chucking device 5 is disposed on a cross slide 4 which is mounted on a machine bed 3. By means of the cross slide 4 which comprises two numerically controlled axes, the workpiece chucking device 5 is movable in a first horizontal direction, the X axial direction 6, and in a second horizontal direction, the Y axial direction 7. The X-axis and the Y-axis are at right angles to each other. The workpiece chucking device 5 has a right support 5a and a left support 5b, between which one or more workpieces 2 are clamped. The two supports 5a, 5b are displaceably constructed with regard to each other in the X axial direction for clamping workpieces of differing length. In each support there are chucking means, for example two-jaw chucks, for rotatably holding the ends of workpieces 2. In the embodiment shown, a drive is provided in the right support 5a to impart a rotational movement to the two workpieces 2 illustrated. This rotational movement is also numerically controlled, as indicated by A on the axis of rotation 8. The machine bed 3 also comprises a stand 9, to which is overhangingly fixed a support device 10 projecting over the workpieces 2, displaceable in a numerically controlled vertical Z axial direction. Two grinding attachments 11 are exchangeably inserted in support device 10. Each grinding attachment comprises a grinding means 12, which in the illustrated embodiment is an endless grinding belt. Controlled means disposed in support device 10 for holding grinding attachments 11 render possible automatic exchange of the grinding attachments. The fixing means mentioned here are described in detail below.

Support device 10 also comprises first drive means 16, for example an electric motor, with which, via coupling means not illustrated in these figures, grinding means 12 are infinitely variably driveable in the grinding attachments. Support device 10, which in the grinding position extends away from stand 9 in the Y axial direction, comprises a grinding attachment carrying part 23, which is mounted inclinably on one angular supporting element 18. In said position of the supporting part 10, the axis of inclination runs parallel to the Y axial direction and is, as indicated by B, also a numerically controlled axis 14. A second drive means 17 disposed on support device 10, for example a servomotor, is intended for adjusting the angle of inclination of the grinding attachment carrying part 23, as shown below. This angle of inclination may be at least $+/-45°$ with respect to the Z axial direction.

Built into grinding attachment carrying part 23 of support device 10 but not visible in FIGS. 1 and 2, is a third drive means which is intended so that each of the grinding attachments is rotatable around another numerically controlled axis 15, designated by C, by any angle required. Each latter axis is a grinding attachment longitudinal axis and runs parallel to the Z axial direction when the angle of inclination of grinding attachment carrying part 23 is 0°.

A tool store 19 is erected set back from the machine bed, in which several grinding attachments 11 with different grinding means 12 are held on retainer elements 20. In order to exchange the grinding attachments, stand 9, as shown in FIG. 2, is pivotable about another axis 22 designated by D. By way of this pivot position, support device 10, in particular the grinding attachment carrying part 23, assumes a position opposite retainer elements 20 which do not contain a grinding attachment. By means of the controlled fixing means, (already mentioned, but not visible in FIGS. 1 and 2 described here), on support device 10, grinding attachments 11 inserted in the latter are disengaged and transferred to retainer elements 20. By means of peripheral forward motion of tool store 19, new grinding attachments 11 assume a position opposite grinding attachment carrying part 23 and can be attached to the latter by means of the fixing means. After stand 9 pivots back, grinding can be continued with new grinding attachments.

All the said numerically controlled axes, the controlled fixing means, the pivot movement of stand 9 and the peripheral forward motion of the tool store are controlled by a control system which is not illustrated.

According to the invention it is intended that the number of grinding attachments 11 inserted simultaneously in support device 10 may be varied. It would be conceivable to widen support device 10 and workpiece chucking device 5 such that not only one or two workpieces but three, four, etc. could be machined simultaneously. One grinding attachment 11 is then associated with each workpiece 2. During machining, all workpieces 2 and grinding attachments 11 undergo adjustment and feed movements which are identical in amount and direction for each workpiece and each grinding attachment.

The automatic exchange of the grinding attachments requires only short stoppage times. The grinding means can be optimally adapted to the contour of the workpiece being machined at that moment. The transition from rough grinding to precision grinding or polish grinding requires no time-consuming changing of the grinding belt in the grinding attachment itself, but merely the automatic exchange of pre-prepared grinding attachments. Used endless grinding belt can be replaced in one or several grinding attachments whilst the machine works with other grinding attachments. By means of the numerical control of all said axes, i.e. by means of the simultaneous 6-axes control, even errors which have been unintentionally worked into the workpieces during the production process can be removed or reduced during the grinding process. Fully automatic surface grinding is possible with the illustrated machining centre without the permanent presence of an operator. It should also be mentioned that the whole machining centre can be encased in a protective casing 21.

FIGS. 3 and 4 illustrate a significant part of the machining centre of the invention, support device 10 in a side elevation and a front elevation. In FIG. 3, between the angular supporting element 18 and the grinding attachment carrying part 23, two bearings 44 are visible, around whose axis B the grinding attachment carrying part is inclinable. The drive for adjusting a certain angle of inclination comes from the second drive means 17, a servomotor. This latter is fixed to grinding attachment carrying part 23 and acts via a toothed belt spread 40 on a worm gear 41. On the worm wheel shaft of this gear is disposed a pinion 42, which meshes with a gear rim segment 43 mounted rigidly on the angular supporting element. When motor 17 is switched on, gear pinion 42 moves along gear rim segment 43 according to the direction in which the motor rotates. Grinding attachment carrying part 23 with inserted grinding attachments 11 is thereby inclined by a corresponding angle. Said bearings 44 are disposed so that the axis of inclination B forms a tangent with the turning points 56, facing the workpieces, of grinding means 12.

The drive for grinding attachments 11 results from the first drive means 16, an electric motor, for example, which is also fixed to grinding attachment carrying part 23. The drive shaft 27 of this motor acts on a drive wheel 30 which is associated to a first grinding attachment 11 and which is connected with a second drive wheel 31 via connecting means 32, preferably a toothed belt. The second drive wheel 31 is associated to a second grinding attachment 11. By cascade connection of further drive wheels, the modular arrangement of more pregrinding attachments 11 would be possible. A shaft 45 extends from each drive wheel 30, 31 in the direction of each associated grinding attachment 11. Disposed at the end of each of these shafts is a drive spur wheel 28 which is displaceable in the longitudinal direction of the shaft. A compression spring 29 ensures that each of the drive spur wheels 28 engages with a coupling spur wheel 39 on each of the grinding attachments, in order to drive grinding means 12 in each of grinding attachments 11. A third drive means 26, also a servomotor, acts via a drive disk 34 and another toothed belt 35 on a worm shaft 36. This latter is intended to drive worm wheels 37 which are disposed concentrically to shafts 45 above each of the grinding attachments 11 in grinding attachment carrying part 23. For each grinding attachment 11, fixing means 49 are rotatably connected with each of the worm wheels 37. With the third drive means 26 disposed in grinding attachment carrying part 23, the grinding attachments are rotatable around said axis C by any angle, as already mentioned. Since the longitudinal axis of the grinding attachment, designated by 38, which, with regard to grinding means 12 is also the symmetrical axis both in FIG. 3 in side elevation and in FIG. 4 in front elevation, falls together with the axis of rotation C and since the axis of inclination B of grinding attachment carrying part 23 runs tangential to the turning point or points 56 of one or all of grinding means 12 and intersects each of the longitudinal axes of the grinding arrangement at a right angle, changes in the angle of inclination and the rotation position of the grinding attachments essentially entail no relative change in the X, Y and Z position with regard to the workpiece. This simplifies the control.

A preferred embodiment of a grinding attachment 11 according to the invention for the machining centre is shown in FIG. 5 as a side elevation. The drive of grinding means 12, which comprises an endless grinding belt 52 and a generated surface, facing the workpiece, of a contact roller 55 around which the grinding belt is looped, results from a drive disk 51. This latter is disposed on a first shaft 69 which is rotatably mounted in a frame part 71 of grinding attachment 11. The first shaft 69 is connected with a second shaft 70, which is also rotatably mounted in said frame part 71, via a flat belt drive 50. The already mentioned coupling spur wheel 39 is disposed on the second shaft 70. The endless grinding belt 52 is guided around drive disk 51 over deflecting rollers 53, over guide rollers 54 and around contact roller 55. Deflecting rollers 53 are disposed parallel to the longitudinal axis 38 of the grinding attachment and displaceably on a slide 58. A pneumatically operating cocking cylinder 57, connected with the housing of grinding attachment 11, acts to stretch endless grinding belt 52 on said slide 58. The air inlet pin for cocking cylinder 57, disposed on frame part 71, is designated by 59.

As already said, in the side elevation and the front elevation, the longitudinal axis 38 of the grinding attachment runs symmetrical to grinding means 12. The point at which this grinding attachment longitudinal axis intersects with the side of the generated surface, facing the workpiece, of contact roller 55, around which the grinding belt is looped, is designated by 56 as the turning point of the grinding means, and serves as the control reference point.

Depending on the structure of the workpiece to be machined, for example where there are curves with large or small radii, grinding attachments must be prepared whose contact rollers 55 have different diameters. The grinding attachments are designed so that the contact rollers 55 are easily exchangeable. These latter are rotatably mounted at one end of a contact roller support 67, the axis of rotation lying at a right angle to the longitudinal axis of the grinding attachment. Contact roller support 67 is fixed with fixing screws 66 and positioned exactly with a positioning pin 68 to the frame part 71 of the grinding attachment. The contact roller holders are designed so that for all the diameters of contact rollers 55 used, the control reference point 56 lies at the same point on the grinding attachment longitudinal axis. In other words, the distance between the control reference point 56 and for example coupling spur wheel 39 is the same, regardless of the diameter of the contact roller. Moreover, it is also intended that contact rollers and grinding belts with differing widths be used.

Naturally, it would be conceivable, although not illustrated here, to use instead of the endless grinding belt and contact roller 55, a grinding disk as grinding means, which would be arranged in the same way as contact roller 55 shown in FIG. 6 so that a further showing thereof is not thought necessary. For a person skilled in the art, the realization of a for such a grinding disk should be derivable in an obvious way from the state of the art.

Disposed at the side of the grinding attachment, essentially parallel to grinding attachment longitudinal axis 38, are retainer means 60, 61 which work together with the controlled fixing means 49 on grinding attachment carrying part 23. The retainer means comprise a guide track 60, at whose upper and lower end there is a guide plate 61 with laterally bevelled end surfaces. Fixing means 49 comprise essentially a guide roller carrier plate 62, on which four spaced guide rollers 63 are disposed in a rectangle. Each of the guide rollers 63 has a notch 72 which is designed so that each of the guide plates 61 is fixable between two guide rollers adjacent in the transverse direction to longitudinal axis 38. With a blocking cylinder 64, for example a hydraulic cylinder, a blocking pin 73 is pressed against a bore 74 disposed in said guide track 60 to fix and hold the grinding attachment to the grinding attachment carrying part.

The automatic grinding attachment exchange already described above takes place more exactly in the sense that through the pivoting of stand 9, the grinding attachments inserted in the grinding attachment carrying part are placed on the carrier elements 20 of tool store 19 (FIG. 2). After the blocking pin 73 has been withdrawn from bore 74, support device 10 is moved upwards in the Z axial direction until guide rollers 63 no longer engage with guide plates 61. It is now possible to remove the disengaged grinding attachments from grinding attachment carrying part 23 by means of carrier elements 20. New grinding attachments are brought up to grinding attachment carrying part 23 and then engaged in the reverse sequence.

To protect grinding attachment II, it may be covered with a covering 65.

FIG. 6 illustrates a turbine blade 2 as the workpiece. It can be seen immediately from this figure that, depending on the shape of the structure to be machined, it is expedient to use grinding attachments with contact rollers 55, 55' with different diameters. Curves in workpiece 2 with a large radius are more efficiently machined with a contact roller 55 with a large diameter, whereas curves in workpiece 2 with a small diameter must be machined with a contact roller 55' with a correspondingly small diameter. Depending on the shape of the structure of the workpiece it is advantageous to change the direction of grinding. By adjusting the angle of rotation of the grinding attachment, the latter may be adapted to the direction of grinding. Depending on the manner of machining, grinding attachments in which are inserted grinding belts 52, 52' of differing coarseness, are used.

It is obvious that the exchangeability of the grinding attachments and the sequential insertion of grinding attachments with grinding means which are optimally adapted to the corresponding machining process, bring significant advantages over the state of the art with regard to the reduction of the stoppage times. The productivity of the machining centre can be further increased by the simultaneous machining of several identical workpieces. Additional savings are possible in that the continuous presence of an operator is no longer necessary. However, it should be noted once again that the essential advantage of this invention is that it is possible with this machining centre not only to improve surfaces, but also to reduce or remove errors which may have occurred during the production process of the workpiece.

We claim:

1. A machining centre for grinding workpieces with complex shaped surfaces, comprising:
    a machine bed having a cross slide mounted thereon;
    a workpiece chucking device being movably disposed on said cross slide, said cross slide including means for moving said workpiece chucking device in both a first horizontal axial direction (X) and a second horizontal axial direction (Y), said first and second axial directions (X and Y) being at right angles to each other;
    said workpiece chucking device including two spaced apart support means being displaceable relative to each other in said first horizontal axial direction (X) for pivotably clamping at least one workpiece therebetween;
    a support device disposed above said cross slide, means for displacing said support device in a vertical axial direction (Z) at a right angle to said first and second horizontal axial directions (X and Y);
    said support device including engagement means for controllably holding and releasing at least one exchangeable grinding attachment, said grinding attachment being moved with said support device along said vertical axial direction (Z);
    first means for inclining said one exchangeable grinding attachment with respect to said vertical axial direction (Z);
    second means for rotating said one exchangeable grinding attachment around a longitudinal axis of said one exchangeable grinding attachment;
    said one exchangeable grinding attachment including grinding means disposed therein for grinding a surface of the workpiece;
    said support device including drive means for driving said grinding means;
    numerically controllable means for regulating said grinding means to grind the surface of the workpiece to a predetermined required measurement;
    a tool store housing additional exchangeable grinding attachments;
    means for pivoting said support device into an exchange position adjacent to said tool store; and
    means for automatically exchanging said one exchangeable grinding attachment for a selected one of said additional exchangeable grinding attachments when said support device is in said exchange position.

2. A machining centre according to claim 1, wherein said engagement means rotate concentrically around said longitudinal axis of said one exchangeable grinding attachment.

3. A machining centre according to claim 1, wherein said first means permits said one exchangeable grinding attachment to incline at least $+/-45$ degrees with respect to said vertical axial direction (Z), said first means being provided on said support device with an axis of inclination of said first means being parallel to said second horizontal axial direction (Y) to adjust an angle of inclination of said one exchangeable grinding attachment.

4. A machining centre according to claim 1, wherein said first means is numerically controlled to adjust an angle of inclination of said one exchangeable grinding attachment.

5. A machining centre according to claim 1, wherein said second means permits said one exchangeable grinding attachment to rotate by any angle around said longitudinal axis of said one exchangeable grinding attachment, said second means being provided on said support device to adjust an angle of rotation of said one exchangeable grinding attachment.

6. A machining centre according to claim 1, wherein said second means is numerically controlled to adjust an angle of rotation of said one exchangeable grinding attachment.

7. A machining centre according to claim 1, wherein said support means of said workpiece chucking device pivotably clamps several workpieces therebetween, said support device being equipped with several exchangeable grinding attachments, each of said several exchangeable grinding attachments being associated with a respective one of the several workpieces, said first and second means and said drive means driving and adjusting corresponding angles of all said several exchangeable grinding attachments so that adjustment movements take place simultaneously in all said several exchangeable grinding attachments with the adjustment movements being identical in amount for each of said several exchangeable grinding attachments.

8. A machining centre according to claim 1, wherein said grinding means includes an endless grinding belt.

9. A machining centre according to claim 1, wherein said grinding means includes a generated surface on a rotating cylinder-shaped disk with said generated surface facing the workpiece, said one exchangeable grinding attachment being provided with retainer means for engaging said engagement means of said support device, and coupling means for coupling said grinding means with said drive means of said support device.

10. A machining centre according to claim 9, wherein said longitudinal axis of said one exchangeable grinding attachment extends as a diameter through said disk, and also extends through a center of an axial length of said disk.

11. A machining centre according to claim 10, wherein said one exchangeable grinding attachment includes means to permit said disk to be exchanged for other disks having generated surfaces and different diameters, said disks being inserted in said one exchangeable grinding attachment so that, for all said disks, said generated surface of each disk faces the workpiece and always lies at a predetermined point on said longitudinal axis of said one exchangeable grinding attachment regardless of the diameter thereof.

12. A machining centre according to claim 11, wherein said point is positioned at an intersection of said longitudinal axis of said one exchangeable grinding attachment with an axis of inclination around which said one exchangeable grinding attachment is inclined.

13. A machining centre according to claim 9, wherein said disk is a contact roller, and said grinding means includes an endless grinding belt guided around said contact roller.

14. A machining centre according to claim 9, wherein said disk is a grinding disk.

15. A machining centre according to claim 9, wherein said retainer means are disposed laterally from said one exchangeable grinding attachment and extend substantially parallel to said longitudinal axis of said one exchangeable grinding attachment.

* * * * *